April 27, 1926.
W. H. HUNGERFORD
BISCUIT SORTING MACHINE
Filed Nov. 28, 1923
1,582,820
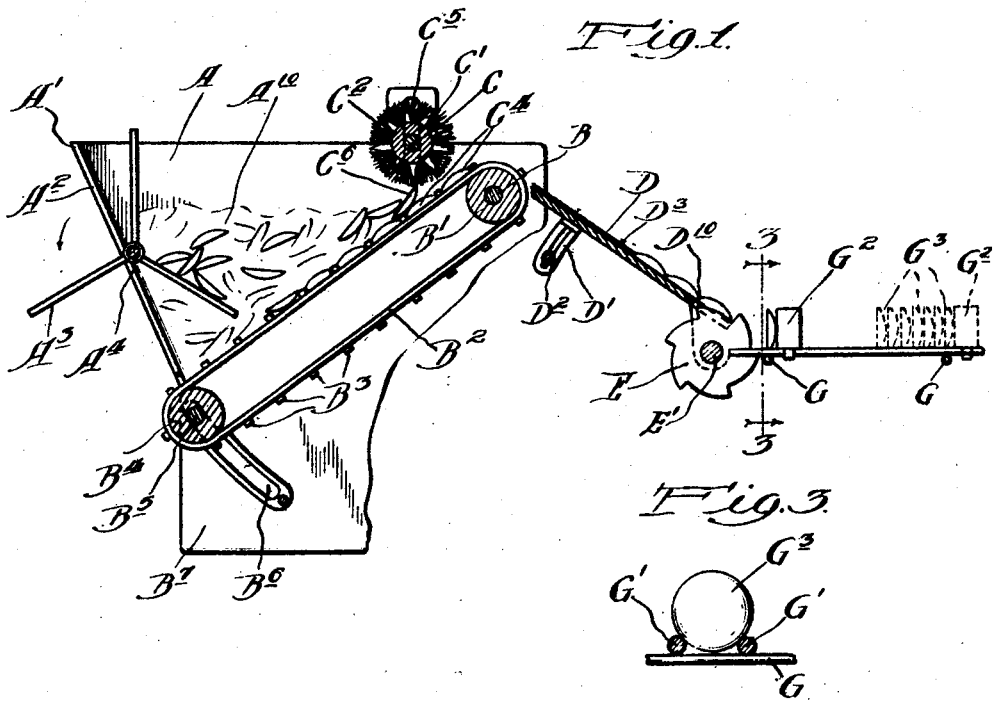
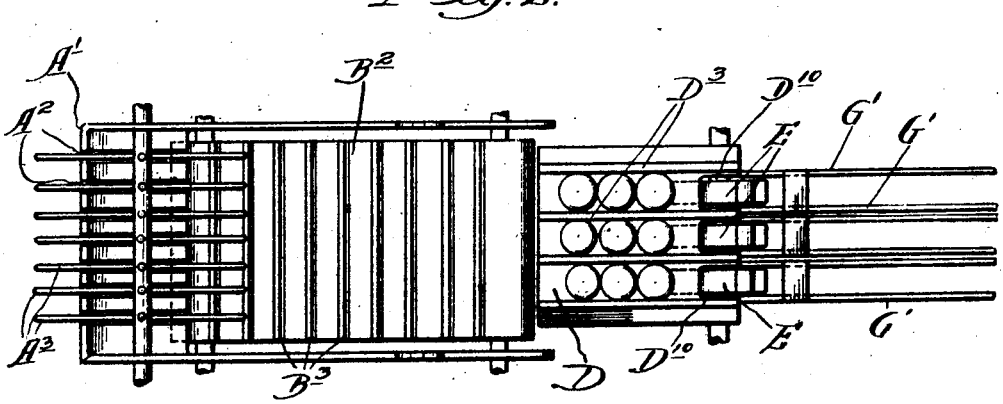
Inventor:
Warren H. Hungerford
By Parker & Carter
Attys Patented Apr. 27, 1926.

1,582,820

UNITED STATES PATENT OFFICE.

WARREN H. HUNGERFORD, OF CHICAGO, ILLINOIS.

BISCUIT-SORTING MACHINE.

Application filed November 28, 1923. Serial No. 677,379.

*To all whom it may concern:*

Be it known that I, WARREN H. HUNGERFORD, a citizen of the United States, residing at Chicago, in the county of Cook and State of Illinois, have invented a certain new and useful Improvement in Biscuit-Sorting Machines, of which the following is a specification.

My invention relates to means for sorting or facing biscuits. I illustrate it in connection with a biscuit stacker but it will be realized that I have no intention of limiting myself to this specific association. One object of my invention is to provide means for facing or sorting biscuits in such fashion that biscuits from any suitable container or feeding means may be sorted and faced and delivered with each biscuit having the same side faced in the same direction. Another object of my invention is to provide a biscuit facing or sorting device adapted to deliver faced or sorted biscuits to a biscuit stacker or stacking table. Other objects will appear from time to time in the course of the specification and claims.

I illustrate my invention more or less diagrammatically in the accompanying drawings, wherein—

Figure 1 is a diagrammatic longitudinal section;

Figure 2 is a plan view; and

Figure 3 is a section on the line 3—3 of Figure 2.

Like parts are illustrated by like characters throughout the drawings and specification.

A is any suitable biscuit containing hopper into which the biscuits are fed from any suitable source or conveyor not herein shown. $A^1$ is a rear wall of the hopper slotted as at $A^2$ to permit the passage of the agitating arms $A^3$ which are mounted upon the shaft $A^4$ which is rotated by any suitable mechanism not herein shown, in the direction of the arrow of Figure 1. The lower left end of the hopper is normally filled with a biscuit mass $A^{10}$.

B is a drive shaft driven from any suitable source not herein shown. Mounted upon it is the pulley $B^1$ about which passes the belt $B^2$ upon which are the transverse flights $B^3$. The pulley passes about the roller $B^4$ which rotates on the shaft $B^5$, beneath the slotted end $A^1$ of the hopper A, there being just sufficient clearance between the pulleys and the bottom of the hopper to permit the passage of the belts and the flights $B^3$, it being understood that the flights are substantially lower in height than the maximum height or thickness of the biscuits handled. The roller $B^4$ and the shaft $B^5$ are preferably adjustable in order to adjust the angle of the belt $B^2$. I illustrate the shaft $B^5$ as adjustable along the arcuate slot $B^6$ in the frame or supporting member $B^7$ of the hopper, the center of the arc $B^6$ being the axis of rotation of the shaft B.

C is a brush shaft driven from any suitable power source, not shown, in a direction contrary to the upward travel of the belt $B^2$. It rotates the relatively small brush core $C^1$ and the relatively large soft brush bristle body $C^2$, the periphery of the brush being spaced above the belt sufficiently to permit the passage therebeneath of the belt, the belt flights, and of biscuits shown in the position of the biscuits $C^4$, flat side down on the belt and beneath the flights. The brush may be vertically adjusted, for example along the adjusting slot $C^5$. It will be understood that it may be necessary to remove the belt and replace it when the size of the biscuits handled is changed, since preferably the distance between flights should be substantially equal to the width of the biscuits handled. $C^6$ illustrates a biscuit which has not been positioned flat side down between the flights and which is therefore brushed back by the brush $C^2$.

D is a slide positioned adjacent the roller $B^1$ and adapted to receive therefrom the biscuits fed forward by the belt $B^2$. It may be adjusted, for example, by the quadrant $D^1$ and the set screw $D^2$. The slide is provided with guiding ribs $D^3$ which divide the surface of the slide into any desired number of longitudinal tracks.

It will be understood, of course, that when the biscuit is changed the slide D, may, if necessary, be removed and replaced by a slide in which the distance between the ribs $D^3$ is substantially equal to the size of biscuit at that time being handled.

E is a stacker wheel mounted for rotation upon the shaft $E^1$, the power source for which is not herein shown. I provide a separate wheel E for each track of the slide D. I illustrate the slide D as cut away as at $D^{10}$, $D^{10}$ between each pair of ribs $D^3$, to admit the wheel E.

G, G are stacking table supports, here shown as transverse bars upon which rest the longitudinal bars G¹, G¹ arranged in pairs to correspond with the tracks of the slide D and the wheels E. The wheels E each penetrate between a pair of bars, as shown in Figures 1 and 2. G² is any suitable follower block which rides along the bars G¹, G¹ and G³, G³ are biscuits positioned on the bars G¹ and held in vertical position by the follower block G².

It will be realized that while I have shown an operative device, many changes might be made in the size, shape, number, proportion and disposition of parts without departing from the spirit of my invention.

The use and operation of my invention are as follows:

I provide a sorting device which is particularly adaptable for the sorting of biscuits for packing or for delivering sorted biscuits to other biscuit handling machinery, wherever it is desirable that biscuits be sorted or faced with the like face of each biscuit facing in the same direction. I do not, however, limit the operation of my device to biscuits, since it may be used also for sorting many forms of flat candies, and of course is available for sorting relatively thin objects of any material which are shaped with one flat side and one more less rounded side or edge.

As the belt B² passes beneath the mass of cookies contained in the hopper it carries them upwardly toward the brush C² which is rotated in a direction opposite to the travel of the belt. The belt is provided with transverse flights which are preferably of small height. The biscuits which lodge flat side down are in a sense gripped by the flights and the flights are high enough to over-lap the edges of the cookies, the domed shaped center portion presenting no purchase for the brush. The speed of the brush and its distance from the belt will of course be adjusted, so that the biscuits shown in C⁴ will not be swept out from between the flights. However, if a biscuit lodges with the round side down, the height of the flights is such that the edge of the biscuit projects above the flight and the rounded bottom of the biscuit gets no purchase against any flight and the brush therefore easily brushes back the biscuit into the mass of cookies in the hopper, and only the biscuits which position themselves flat side down between the flights are carried past the brush. The angle of the belt may be adjusted to control the mass or volume of cookies carried upwardly by the belt, an increase in the angle reducing the tendency of the cookies to be carried upwardly by the belt. The cookies in the hopper may be agitated by the fingers A³ in order to prevent packing and in order to continually change the position of each individual cookie so that a sufficient proportion will tend to drop in proper position on the belt and between the flights. Since only biscuits with flat side down are able to pass the brush, a complete separation is effected and all the biscuits which ride the slide D reach it flat side down and drop into one or the other of the tracks or lanes formed by the ridges D³. The volume passing down the slide D is of course regulated by the adjustment of the belt B², or of the brush C². As the toothed wheel E is rotated it turns each biscuit successively and deposits it in vertical position on the stacking bars or slides G¹, as shown in Figures 1 and 3. The follower block G² holds the first biscuit of any given series in vertical position and the wheel feeds a succession of biscuits against it which move it and the follower block forward until each track or pair of bars G¹ is filled with biscuits. As they accumulate on the tracks of the stacking table, the operator can remove them and drop them in a box or otherwise dispose of them, pushing the follower block back when any one track of the stacking table is clear.

Where I use the word "biscuit" in the claims, it will be understood that I do not thereby wish to limit myself, but wish that the word be taken in the claims as descriptive of any article which is the equivalent in shape and consistency of the biscuits shown in the drawings herein, and of such weight and size as to lend itself to sorting or facing by the method herein described.

Although the device herein shown is most representatively illustrated by the use of cookies of the shape shown in Figure 1, it may be used to sort cookies or other objects having a flat top as well as a flat bottom, even if only the edge or periphery of one side of the cookie is rounded. My device will operate on any object which, when laid on one side, has its square or sharp edge concealed by the projecting flights, whereas when turned on the other side it has it exposed above the edge of the flight and thus exposed to the action of the brush.

While I have shown a brush, it is obvious that other moving elements of other shape and material could be used, the necessity being an element which will strike against the exposed edges of the reversed cookies and which is preferably sufficiently flexible not to damage them by its blow.

I claim:

1. The process of sorting objects having a plane side and a concave side which consists of depositing said articles upon a moving member provided with upwardly projecting flights of less height than the thickness of said articles, conveying the articles from the zone of deposit of said articles, and sweeping rearwardly toward said zone of deposit all articles which lodge upon the moving member concave side down, and conveying forwardly all articles which lodge upon the moving member with their plane side down and in contact with its surface.

2. A device for facing relatively thin articles having edges one side of which lie in the bottom plane of the article, the other side being generally inclined thereto or beveled, which comprises a conveying member and means for imparting a generally longitudinal movement thereto, a plurality of members upwardly projecting therefrom, the height of said members being less than the thickness of the articles being faced, but being sufficient to engage the edges of said articles when they rest plane side down thereupon, and means, operative in reverse direction to the direction of movement of the conveying member, for engaging and repelling all articles resting upon the conveying member with their plane side up.

3. A device for facing relatively thin articles having one plane side, the opposite sides of the edges being beveled or inclined to the plane side, which comprises a conveying belt and means for imparting a generally continuous movement thereto, a plurality of members upwardly projecting therefrom, the height of said members being insufficient to engage the edge of said articles, when said articles rest beveled side down upon the belt but being sufficient to engage the edges of said articles when they rest plane side upon the belt and means, operative in reverse direction to the direction of movement of the belt, for engaging and repelling all articles resting upon the belt with the plane side up.

4. A device for facing relatively thin articles having one plane side, the opposite sides of the edges being beveled or inclined to the plane side, which comprises a conveying belt and means for imparting a generally continuous movement thereto, a plurality of members upwardly projecting therefrom, the height of said members being insufficient to engage the edge of said articles, when said articles rest beveled side down upon the belt but being sufficient to engage the edges of said articles when they rest plane side upon the belt and means, operative in reverse direction to the direction of movement of the belt, for engaging and repelling all articles resting upon the belt with the plane side up, comprising a rotary brush and means for rotating it in opposition to the movement of said belt.

5. A device for facing relatively thin articles having one plane side, the opposite sides of the edges being beveled or inclined to the plane side, which comprises a conveying belt and means for imparting a generally continuous movement thereto, a plurality of members upwardly projecting therefrom, the height of said members being insufficient to engage the edge of said articles, when said articles rest beveled side down upon the belt but being sufficient to engage the edges of said articles when they rest plane side upon the belt and means, operative in reverse direction to the direction of movement of the belt, for engaging and repelling all articles resting upon the belt with the plane side up, comprising a rotary brush and means for rotating it in opposition to the movement of said belt, said belt being upwardly inclined toward said brush.

6. The process of sorting objects having a plane side and a concave side which consists in agitating a mixed mass of said articles, depositing said articles upon a moving member provided with upwardly projecting flights of less height than the thickness of said articles, conveying the articles from the zone of deposit of said articles, and sweeping rearwardly toward said zone of deposit all articles which lodge upon the moving member concave side down, and conveying forwardly all articles which lodge upon the moving member with their plane side down and in contact with its surface.

7. A device for facing relatively thin articles having edges one side of which lie in the bottom plane of the article, the other side being generally inclined thereto or beveled, which comprises a conveying member and means for imparting a generally longitudinal movement thereto, a plurality of members upwardly projecting therefrom, the height of said members being less than the thickness of the articles being faced, but being sufficient to engage the edges of said articles when they rest plane side down thereupon, and means, operative in reverse direction to the direction of movement of the conveying member, for engaging and repelling all articles resting upon the conveying member with their plane side up, and means for agitating or moving the mass of articles resting upon the lower portion of the conveying member.

Signed at Chicago, county of Cook and State of Illinois, this 26th day of November 1923.

WARREN H. HUNGERFORD.